(12) United States Patent
Banno

(10) Patent No.: US 7,160,827 B2
(45) Date of Patent: Jan. 9, 2007

(54) DIELECTRIC CERAMIC COMPOSITION AND MULTILAYER CERAMIC CAPACITOR

(75) Inventor: Koichi Banno, Yasu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 11/494,446

(22) Filed: Jul. 28, 2006

(65) Prior Publication Data

US 2006/0264317 A1 Nov. 23, 2006

Related U.S. Application Data

(63) Continuation of application No. PCT/JP2005/001919, filed on Feb. 9, 2005.

(30) Foreign Application Priority Data

Feb. 27, 2004 (JP) ............................. 2004-052741

(51) Int. Cl.
*C04B 35/468* (2006.01)
(52) U.S. Cl. .................... 501/138; 501/139; 361/321.4
(58) Field of Classification Search ................ 501/138, 501/139; 361/321.4
See application file for complete search history.

(56) References Cited

U.S. PATENT DOCUMENTS 6,620,754 B1 * 9/2003 Mizuno et al. ............. 501/138
6,620,755 B1 * 9/2003 Saito et al. ................. 501/138

FOREIGN PATENT DOCUMENTS

| JP | 02-258671 | 10/1990 |
| JP | 11-322416 | 11/1999 |
| JP | 2000-103668 | 4/2000 |
| JP | 2001-143955 | 5/2001 |
| JP | 2002-050536 | 2/2002 |

OTHER PUBLICATIONS

PCT/JP2005/001919 Copy of International Search Report, Mar. 23, 2005.
PCT/JP2005/001919 Copy of Written Opinion, Mar. 23, 2005.

* cited by examiner

*Primary Examiner*—Karl Group
(74) *Attorney, Agent, or Firm*—Dickstein, Shapiro, LLP.

(57) ABSTRACT

A dielectric ceramic composition that includes a main component expressed as $100Ba_mTiO_3+xCuO+aRO_n+bMnO+cMgO$ (wherein coefficients 100, x, a, b, and c represent molar ratios; m represents the ratio of Ba to Ti (Ba/Ti); R represents at least one metal element selected from Y, La, Ce, Pr, Nd, Sm, Eu, Gd, Tb, Dy, Ho, Er, Tm, Yb, and Lu; and n represents a positive number required to maintain electroneutrality and is determined by the valence number of R), wherein m, x, a, b, and c meet the following relationships: $0.990 \leq m \leq 1.050$; $0.1 \leq x \leq 5.0$; $9.0 \leq a \leq 20.0$; $0.5 \leq b \leq 3.5$; and $0 < c \leq 4.0$, and the dielectric ceramic composition contains 0.8 to 5.0 parts by weight of a sintering additive with respect to 100 parts by weight of the main component.

13 Claims, 1 Drawing Sheet

DIELECTRIC CERAMIC COMPOSITION AND MULTILAYER CERAMIC CAPACITOR

CROSS-REFERENCE TO RELATED APPLICATIONS

The present application is a continuation of International Application No. PCT/JP2005-001919, filed Feb. 9, 2005, which claims priority to Japanese Patent Application No. JP2004-052741, filed Feb. 27, 2004, the entire contents of each of these applications being incorporated herein by reference in their entirety.

FIELD OF THE INVENTION

The present invention relates to dielectric ceramic compositions and multilayer ceramic capacitors. In particular, the present invention relates to a dielectric ceramic composition and a multilayer ceramic capacitor that have high reliability when the dielectric ceramic composition and the multilayer ceramic capacitor are operated with high-voltage direct current or high-frequency/high-voltage alternating current.

BACKGROUND OF THE INVENTION

Multilayer ceramic capacitors have often been operated with low-frequency low-voltage alternating current or low-voltage direct current. In recent years, however, with developments in electronics, as rapid progress has been made in the miniaturization of electronic devices, multilayer ceramic capacitors also have been reduced in size and increased in capacity. As a result, a voltage applied between a pair of electrodes in such a multilayer ceramic capacitor has tended to relatively increase. Such multilayer ceramic capacitors have been required to have higher capacitance, lower loss, improved insulation properties, improved dielectric strength, and higher reliability under stringent conditions.

For example, Patent Documents 1, 2, and 3 propose dielectric ceramic compositions and multilayer ceramic capacitors that can be used with high-frequency, high-voltage alternating current or high-voltage direct current.

The dielectric ceramic composition described in Patent Document 1 is represented by a general formula $ABO_3+aR+bM$ (wherein $ABO_3$ is a general formula representing a barium titanate solid solution; R represents an oxide of at least one element selected from La, Ce, Pr, Nd, Sm, Eu, Gd, Tb, Dy, Ho, Er, Tm, Yb, and Lu; M represents an oxide of at least one element selected from Mn, Ni, Mg, Fe, Al, Cr, and Zn), wherein A/B, a, and b in a main component meet the following relationships $0.950 \leq A/B \leq 1.050$, $0.12 \leq a \leq 0.30$, and $0.04 \leq b \leq 0.30$. The dielectric ceramic composition contains 0.8 to 8.0 parts by weight of a sintering additive as an accessory component with respect to 100 parts by weight of the main component. The dielectric ceramic composition may further contain 0.35 mol or less of $X(Zr,Hf)O_3$ (wherein X represents at least one element selected from Ba, Sr, and Ca) with respect to 1 mol of the barium titanate solid solution and/or 0.2 mol or less of D (wherein D represents an oxide of at least one element selected from V, Nb, Ta, Mo, W, Y, and Sc) with respect to 1 mol of the barium titanate. The firing temperature of the dielectric ceramic composition is 1,300° C. or lower. The dielectric ceramic composition has a dielectric constant of 200 or more, low loss when operated with high-frequency, high-voltage alternating current, high insulation resistance at high electric strength, characteristics meeting the B and X7R characteristics, and excellent high-temperature load properties.

A reduction-resistant dielectric ceramic compact described in Patent Document 2 includes a solid solution mainly composed of barium titanate; and a sintering additive. The axis ratio, i.e., c/a, of the ceramic compact is determined by X-ray diffraction and meets $1.000 \leq c/a \leq 1.003$ at a temperature of −25° C. or higher. When the dependence of the dielectric constant on temperature is measured with an alternating current having a frequency of 1 kHz at an electric field strength of 2 Vrms/mm, the maximum peak is observed at less than −25° C. The main component is represented by a general formula $ABO_3+aR+bM$ (wherein R represents an compound containing at least one element selected from La, Ce, Pr, Nd, Sm, Eu, Gd, Tb, Dy, Ho, Er, Tm, Yb, and Lu; and M represents a metal oxide containing at least one element selected from Mn, Ni, Mg, Fe, Al, Cr, and Zn), wherein A/B (molar ratio), a, and b in a main component meet the following relationships $1.000 \leq A/B \leq 1.035$, $0.005 \leq a \leq 0.12$, and $0.005 \leq b \leq 0.12$. The dielectric ceramic composition contains 0.2 to 4.0 parts by weight of the sintering additive with respect to 100 parts by weight of the main component. The dielectric ceramic compact may further contain 0.20 mol or less of $X(Zr,Hf)O_3$ (wherein X represents at least one element selected from Ba, Sr, and Ca) with respect to 1 mol of the barium titanate solid solution and/or 0.20 mol or less of D (wherein D represents an oxide of at least one element selected from V, Nb, Ta, Mo, W, Y, Sc, P, Al, and Fe) with respect to 1 mol of the barium titanate solid solution. The dielectric ceramic composition has low loss and low heat generation when high frequency/high voltage are applied and exhibits stable insulation resistance with DC/AC load.

A dielectric ceramic composition described in Patent Document 3 includes barium titanate, a rare-earth oxide (wherein the rare-earth element is at least one element selected from Y, Sm, Eu, Gd, Tb, Dy, Ho, Er, Tm, and Yb), calcium oxide, and silicon oxide without magnesium oxide. The barium titanate is expressed as $Ba_mTiO_3$. The rare-earth oxide is expressed as $RO_{3/2}$ (wherein R represents a rare-earth element. Calcium oxide is expressed as CaO. Silicon oxide is expressed as $SiO_2$. The dielectric ceramic composition is represented by a general formula $100Ba_mTiO_3+aRO_{3/2}+bCaO+cSiO_2$ (wherein coefficients 100, a, b, and c represent molar ratios), wherein m, a, b, and c meet the following relationships $0.990 \leq m \leq 1.030$, $0.5 \leq a \leq 30$, $0.5 \leq b \leq 30$, and $0.5 \leq c \leq 30$. The dielectric ceramic composition does not contain MgO because the coexistence of CaO and MgO causes a deterioration in reliability. The dielectric ceramic composition has the following advantages: Temperature characteristics thereof satisfy the B characteristics specified by JIS and the X7R characteristics specified by EIA. The dielectric loss is as small as 2.5% or less. The product (CR) of insulation resistance (R) and capacitance (C) is 10,000 Ω·F or more when 4 kVDC/mm is applied at room temperature. Insulation resistance is ensured for a prolonged period in accelerated life testing with high voltage at high temperature. Therefore, it is possible to form a highly reliable thinner dielectric ceramic layer for a multilayer ceramic capacitor.

Patent Document 1: Japanese Unexamined Patent Application Publication No. 2000-103668

Patent Document 2: Japanese Unexamined Patent Application Publication No. 2002-50536

Patent Document 3: Japanese Patent No. 3509710

Each of the dielectric ceramic compositions proposed in Patent Documents 1, 2, and 3 can be used with high-frequency high-voltage alternating current or high-voltage direct current and has high reliability. However, it is predicted that trends toward miniaturization and higher capacitance of electronic devices lead to more stringent service conditions. Furthermore, it is also predicted that an improvement in reliability is further required. Thus, it is an urgent issue to ensure and improve reliability under such stringent service conditions.

SUMMARY OF THE INVENTION

The present invention was accomplished to overcome the problems. It is an object of the present invention to provide a highly reliable dielectric ceramic composition and multilayer ceramic capacitor, wherein even if the size is further reduced and capacitance is further increased in the future, the dielectric ceramic composition has low heat generation when operated with high-voltage direct current or high-frequency/high-voltage alternating current and has a dielectric constant and a resistivity that are not inferior to those in the known art.

According to a first aspect of the present invention, a dielectric ceramic composition includes a main component expressed as $100Ba_mTiO_3+xCuO+aRO_n+bMnO+cMgO$ (wherein coefficients 100, x, a, b, and c represent molar ratios; m represents the ratio of Ba to Ti (Ba/Ti); R represents at least one metal element selected from Y, La, Ce, Pr, Nd, Sm, Eu, Gd, Tb, Dy, Ho, Er, Tm, Yb, and Lu; and n represents a positive number required to maintain electroneutrality and is determined by the valence number of R), wherein m, x, a, b, and c meet the following relationships $0.990 \leq m \leq 1.050$; $0.1 \leq x \leq 5.0$; $9.0 \leq a \leq 20.0$; $0.5 \leq b \leq 3.5$; and $0 < c \leq 4.0$, and the dielectric ceramic composition contains 0.8 to 5.0 parts by weight of a sintering additive with respect to 100 parts by weight of the main component.

According to a second aspect of the present invention, the dielectric ceramic composition according to the first aspect of the present invention further contains MO as an additive (wherein M represents at least one metal element selected from Ni and Zn), the main component being expressed as $100Ba_mTiO_3+xCuO+aRO_n+bMnO+cMgO+dMO$, wherein c and d meet the following relationships $0<c+d \leq 4.0$; and $d>0$.

According to a third aspect of the present invention, the dielectric ceramic composition according to the first or second aspect of the present invention further includes $X(Zr,Hf)O_3$ (wherein X represents at least one metal element selected from Ba, Sr, and Ca) as an additive in the main component, wherein the content of the additive is more than 0 mol and 15 mol or less with respect to 100 mol of $Ba_mTiO_3$.

According to a fourth aspect of the present invention, in any one of the first to third aspects of the present invention, the sintering additive is $SiO_2$.

According to a fifth aspect of the present invention, a dielectric ceramic composition includes a plurality of dielectric ceramic layers, the dielectric ceramic layers being laminated; internal electrodes each disposed between the dielectric ceramic layers; external electrodes being electrically connected to the internal electrodes, wherein the dielectric ceramic layers are each composed of the dielectric ceramic composition according to any one of the first to fourth aspects of the present invention.

According to a sixth aspect of the present invention, in the fifth aspect of the present invention, the internal electrodes are each composed of a conductive material mainly containing Ni, a Ni alloy, Cu, or a Cu alloy.

As described above, the dielectric ceramic composition of the present invention contains the main component expressed as $100Ba_mTiO_3+xCuO+aRO_n+bMnO+cMgO$. That is, the main component contains a basic composition, $Ba_mTiO_3$, $RO_n$, and MnO, and additives CuO and MgO. Thus, it is possible to obtain a highly reliable dielectric ceramic composition that has low heat generation when operated with high-voltage direct current or high-frequency/high-voltage alternating current and that has a dielectric constant and a resistivity that are not inferior to those in the known art. The dielectric ceramic composition can be used as a dielectric material for a multilayer ceramic capacitor that is required to have a smaller size and larger capacitance. In the composition formula, m, x, a, b, and c meet the following relationships $0.990 \leq m \leq 1.050$; $0.1 \leq x \leq 5.0$; $9.0 \leq a \leq 20.0$; $0.5 \leq b \leq 3.5$; and $0<c \leq 4.0$.

In the barium titanate, $Ba_mTiO_3$, constituting the main component of the dielectric ceramic composition, the ratio m of Ba to Ti (Ba/Ti) meets $0.990 \leq m \leq 1.050$. At a ratio m of less than 0.990, resistivity is as low as less than $10^{11}$ Ωm. At a ratio m of more than 1.050, mean time to failure shortens in a high-temperature load reliability test.

The CuO content x with respect to $100Ba_mTiO_3$ meets $0.1 \leq x \leq 5.0$ in molar ratio. At a CuO content x of less than 0.1, the mean time to failure is as short as less than 100 hours; hence, reliability is degraded. At a CuO content x of more than 5.0, resistivity is as low as less than $10^{11}$ Ωm.

The $RO_n$ content a with respect to $100Ba_mTiO_3$ meets $9.0 \leq a \leq 20.0$ in molar ratio. At a $RO_n$ content a of less than 9.0, the mean time to failure is as short as less than 100 hours; hence, reliability is degraded. At a $RO_n$ content a of more than 20.0, the dielectric constant decreases. $RO_n$ may be an oxide of one rare-earth element selected from Y, La, Ce, Pr, Nd, Sm, Eu, Gd, Tb, Dy, Ho, Er, Tm, Yb, and Lu. Alternatively, $RO_n$ may be a compound oxide in which at least two rare-earth elements are combined according to need. Furthermore, n in $RO_n$ represents a positive number required to maintain electroneutrality and is determined by the valence number of the rare-earth element R.

The MnO content b with respect to $100Ba_mTiO_3$ meets $0.5 \leq b \leq 3.5$ in molar ratio. When the MnO content b is less than 0.5 or more than 3.5, resistivity is as low as less than $10^{11}$ Ωm.

The MgO content c with respect to $100Ba_mTiO_3$ meets $0<c \leq 4.0$. MgO has the effect of increasing the dielectric constant. At a MgO content c of 0, the mean time to failure is less than 100 hours. At a MgO content c of 4.0, the dielectric constant decreases. MgO has the effect of promoting the formation of a solid solution of the rare-earth element R with ceramic particles. It is possible to improve reliability by addition of MgO. However, if MgO and CaO coexist, CaO degrades the effect of promoting the formation of the solid solution of the rare-earth element R. Thus, desirably, substantially no CaO is contained in the dielectric ceramic composition of the present invention. However, when the dielectric ceramic composition of the present invention is produced, in some cases, CaO is inevitably contaminated. The content of CaO inevitably contaminated is preferably less than 0.5 mol and more preferably less than 0.3 mol with respect to 100 mol of $Ba_mTiO_3$. The phrase "substantially no Ca" defined here means that a small amount of CaO inevitably contaminated may be contained.

Furthermore, the dielectric ceramic composition of the present invention contains 0.8 to 5.0 parts by weight of a sintering additive as an accessory component with respect to 100 parts by weight of the main component. At a content of the sintering additive of less than 0.8 parts by weight with respect to 100 parts by weight of the main component, it is difficult to stably perform sintering. At a content of the sintering additive of more than 5.0 parts by weight, the mean time to failure is less than 100 hours; hence, reliability is degraded. The sintering additive is not particularly limited. A known sintering additive may be used as the sintering additive. In the present invention, for example, $SiO_2$ may be preferably used.

The dielectric ceramic composition contains MO as an additive in the main component. The main component is expressed as $100Ba_mTiO_3+xCuO+aRO_n+bMnO+cMgO+dMO$, wherein c and d preferably meet the following relationships $0<c+d\leq4.0$; and $d>0$. M represents at least one metal element selected from Ni and Zn. Thus, MO may be a metal oxide containing one metal element selected from those. Alternatively, MO may be a compound oxide containing two metal elements. The incorporation of MO in the main component increases the dielectric constant compared with the case where MO is not incorporated. However, if the MO content exceeds 4.0 mol with respect to 100 mol of $Ba_mTiO_3$, the dielectric constant disadvantageously decreases compared with the case where MO is not incorporated.

Preferably, the dielectric ceramic composition of the present invention contains $X(Zr,Hf)O_3$ as an additive in the main component, the content of the additive is more than 0 mol and 15 mol or less with respect to 100 mol of $Ba_mTiO_3$. The incorporation of $X(Zr,Hf)O_3$ in the main component increases the dielectric constant and prolongs the mean time to failure compared with the case where $X(Zr,Hf)O_3$ is not incorporated. When the content of $X(Zr,Hf)O_3$ exceeds 15.0 mol with respect to 100 mol of $BamTiO_3$ in the main component, the dielectric constant disadvantageously decreases compared with the case where $X(Zr,Hf)O_3$ is not incorporated. X represents at least one metal element selected from Ba, Sr, and Ca. The ratio of Zr to Hf in $X(Zr,Hf)O_3$ is not particularly limited. However, the ratio of Hf to Zr is preferably 30 mol % or less in view of sufficient sinterability.

A process for producing material powders for used in the dielectric ceramic composition is not particularly limited. Any process may be employed as long as barium titanate expressed as $Ba_mTiO_3$ can be produced. Usable examples of the process for producing barium titanate include a dry synthesis in which a mixture of starting materials is calcined and then a solid phase reaction is performed; and wet synthesis, such as hydrothermal synthesis, hydrolysis, or sol-gel method.

Furthermore, $RO_n$ (wherein R represents at least one metal element selected from Y, La, Ce, Pr, Nd, Sm, Eu, Gd, Tb, Dy, Ho, Er, Tm, Yb, and Lu) and oxides of Cu, Mn, Si, Mg, Ni, and Zn, which are the additives for $Ba_mTiO_3$ in the main component, are not limited to oxide powders. Solutions of organic metals or alkoxides or carbonates may be used as the starting materials as long as these starting materials can form the dielectric ceramic material according to the present invention. The characteristics obtained by using these materials are not degraded.

The above-described starting material powders are fired to produce a dielectric ceramic composition of the present invention.

The multilayer ceramic capacitor of the present invention includes dielectric ceramic layers composed of the dielectric ceramic composition of the present invention. The use of the dielectric ceramic composition of the present invention as each dielectric ceramic layer results in a multilayer ceramic capacitor having the following characteristics: the dielectric constant is 300 or more; the dielectric loss at 1 kHz and 50 Vrms/mm is 0.5% or less; the resistivity is $10^{11}$ Ωm or more; the mean time to failure is 100 hours or more in a high-temperature load reliability test (175° C., direct current field strength: 40 kV/mm), which exhibits high reliability; and the dielectric loss in applying a high-frequency alternating current with 300 kHz and 1.77 kVrms/mm is as low as 0.8% or less, leading to low heat generation.

Furthermore, internal electrodes constituting the multilayer ceramic capacitor of the present invention can be fired in a reducing atmosphere. That is, the internal electrodes are each composed of a conductive material mainly containing Ni, a Ni alloy, Cu, or a Cu alloy. Thereby, the internal electrodes may be formed at low cost.

According to the first to sixth aspects of the present invention, it is possible to provide a highly reliable dielectric ceramic composition and multilayer ceramic capacitor, wherein even if the size is further reduced and capacitance is further increased in the future, the dielectric ceramic composition has low heat generation when operated with high-voltage direct current or high-frequency/high-voltage alternating current and has a dielectric constant and a resistivity that are not inferior to those in the known art.

Figure 1:
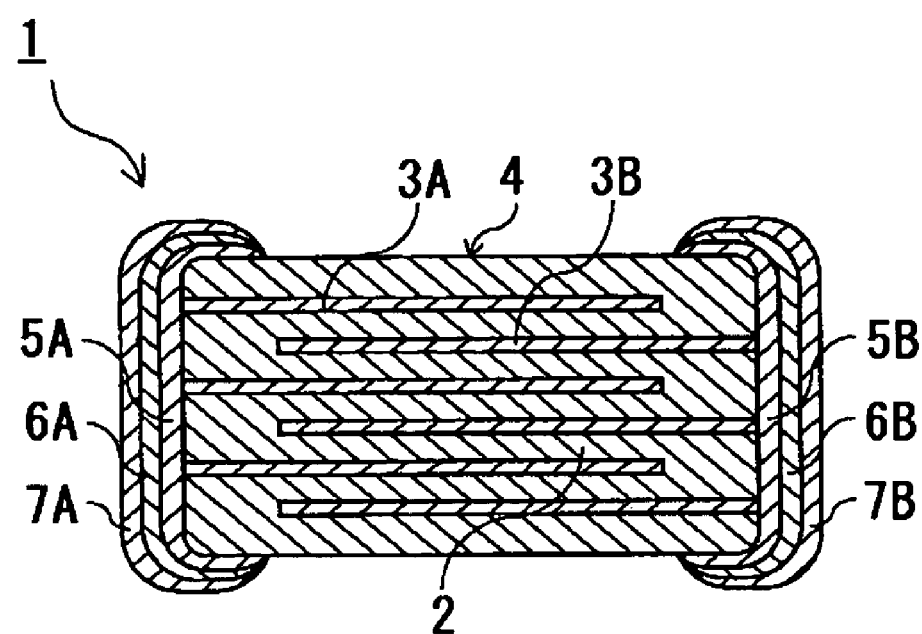
FIG. 1 is a cross-sectional view of a multilayer ceramic capacitor according to an embodiment of the present invention.

REFERENCE NUMERALS 1 multilayer ceramic capacitor
2 dielectric ceramic layer
3A, 3B first and second internal electrodes
4 laminate
5A, 5B first and second external electrodes
6A, 6B first plating layer
7A, 7B second plating layer

DETAILED DESCRIPTION OF THE INVENTION

The present invention will be described below on the basis of an embodiment shown in FIG. 1. FIG. 1 is a schematic cross-sectional view of a multilayer ceramic capacitor according to an embodiment of the present invention.

As shown in FIG. 1, for example, a multilayer ceramic capacitor 1 includes a laminate 4 containing a plurality of dielectric ceramic layers 2, the dielectric ceramic layers being laminated; and a plurality of first internal electrodes 3A and a plurality of second internal electrodes 3B, each of the first and second internal electrodes being disposed between the dielectric ceramic layers 2. A first external electrode 5A is disposed on one side end face of the laminate 4, and a second external electrode 5B is disposed on the other side of the laminate 4. The first external electrodes 5A is electrically connected to the first internal electrodes 3A, and the second external electrode 5B is electrically connected to the second internal electrodes 3B.

As shown in FIG. 1, each of the first internal electrodes 3A extends from one end (left end in the figure) to the proximity of the other end (right end) of the corresponding dielectric ceramic layer 2. Each of the second internal electrodes 3B extends from right end to the proximity of the left end of the corresponding dielectric ceramic layer 2. The first and second internal electrodes 3A and 3B are each composed of a conductive metal mainly containing Ni or the like.

As shown in FIG. 1, the first external electrode 5A is electrically connected to the first internal electrodes 3A in the laminate 4. The second external electrode 5B is electrically connected to the second internal electrodes 3B in the laminate 4. The first and second external electrodes 5A and 5B are each composed of a conductive metal mainly containing Ag or the like. Furthermore, a first plating layer 6A and a second plating layer 7A are disposed in that order on the surface of the first external electrode 5A. A first plating layer 6B and a second plating layer 7B are disposed in that order on the surface of the second external electrode 5B.

EXAMPLE 1

The present invention will now be described on the basis of specific examples. In this example, after preparing Samples 1 to 49 shown in Table 1 according to the procedure described below, multilayer ceramic capacitors were produced with these Samples according to the procedure described below. The resulting multilayer ceramic capacitors were evaluated for electrical properties. Table 2 shows the evaluation results. In Tables 1 and 2, the sample numbers with asterisks indicate that the samples were outside the range of the present invention.

Samples 1 to 49 shown in Tables. 1 and 2 were prepared in order to investigate the influence of m, x, R (rare-earth element), a, b, c, and the content f of a sintering additive in the main component $100Ba_mTiO_3+xCuO+aRO_n+bMnO+cMgO$. Any one of these factors was changed from the inside of the range of the present invention to the outside of the range of the present invention, and the other factors were fixed within the range of the present invention.

(1) Preparation of Dielectric Ceramic Composition

Starting materials shown in Table 1 were weighed and mixed to form material powders having compositions shown in Table 1. A polyvinyl butyral binder and an organic solvent such as ethanol were added thereto. Each of the resulting mixtures was wet-mixed with a ball mill to prepare a ceramic slurry as a dielectric ceramic composition. In this example, $SiO_2$ was used as a sintering additive.

(2) Production of Multilayer Ceramic Capacitor

Each ceramic slurry obtained in item (1) was formed in to a sheet by a doctor blade process to obtain ceramic green sheets each having a thickness of 14 μm. Then, a conductive paste mainly composed of Ni was applied on the ceramic green sheets by screen printing to form conductive paste films for forming internal electrodes.

As shown in FIG. 1, the ceramic green sheets are laminated so as to alternately laminate the side having the conductive paste film to form ceramic green laminates. The resulting ceramic green laminates were heated to 350° C. in a nitrogen gas atmosphere to burn the binder, and then fired for 2 hours at temperatures shown in Table 2 in a reducing atmosphere containing a $H_2$—$N_2$—$H_2O$ gas with an oxygen partial pressure of $10^{-9}$ to $10^{-12}$ MPa to form multilayer ceramic sinters.

On the other hand, a silver paste containing a $B_2O_3$—$SiO_2$—$BaO$ glass frit was prepared. The silver paste was applied to both end faces of each multilayer ceramic sinter. The silver paste applied on both end faces of each multilayer ceramic sinter was baked at 600° C. in a $N_2$ atmosphere to form first and second external electrodes on either end face of each multilayer ceramic sinter, the first and second external electrodes being connected to the first and second internal electrodes, respectively. The surfaces of the first and second external electrodes were subjected to plating twice to form first and second plating layers. Thereby, multilayer ceramic capacitors were produced. Each of the resulting multilayer ceramic capacitors had external dimensions of 3.2-mm—width, 4.5-mm—length, and 0.5-mm—thickness. The dielectric ceramic layer disposed between the first and second internal electrodes had a thickness of 10 μm. The number of effective dielectric ceramic layers was five. The area of each of the opposite electrodes was 2.5 mm² per layer. The resulting multilayer ceramic capacitors, Samples 1 to 49, were evaluated for electrical properties described below. Table 2 shows the evaluation results.

(3) Method for Evaluating Multilayer Ceramic Capacitor on Electrical Properties and Evaluation Results A) Dielectric Constant (ε) and Dielectric Loss (tan δ)

Capacitance (C) and dielectric loss (tan δ) of each of Samples 1 to 49 were measured with an automatic bridge measurement by applying a signal voltage of 50 Vrms/mm at 1 kHz. Dielectric constants (ε) were calculated on the basis of the resulting measurement values of capacitance and the structures of the multilayer ceramic capacitors. Table 2 shows the results.

B) Resistivity (ρ)

Insulation resistance (R) of each of Samples 1 to 49 was determined by applying a DC voltage of 300 V for 60 seconds with an insulation resistance meter. Then, resistivity (ρ) was calculated. Tables 3 and 4 show the results.

C) Mean Time to Failure (MTTF)

Samples 1 to 49 were each subjected to a high-temperature load reliability test as follows: a DC voltage of 400 V was applied to each sample at 175° C. to measure the change in insulation resistance with time. In the high-temperature load reliability test, when the insulation resistance (R) reached $10^6$ Ω or less, it was determined to be a failure. The mean time to failure in each Sample was determined. Table 2 shows the results.

D) Dielectric Loss (tan δ) at High Frequency

For the purpose of evaluation of each of Samples 1 to 49 for heat generation during the application of high-frequency alternating current, a signal voltage of 1.77 kVrms/mm at 300 kHz was applied to each of Samples to measure the dielectric loss (tan δ). Table 2 shows the results.

[Table 1]
$100.0Be_mTiO_3 + xCuO + aRO_n + bMnO + cMgO + fSiO_2$

| Sample No. | m | x | R | a | b | c | f |
|---|---|---|---|---|---|---|---|
| *1 | 0.980 | 1.0 | Gd | 12.0 | 1.0 | 2.0 | 1.25 |
| 2 | 0.990 | 1.0 | Gd | 12.0 | 1.0 | 2.0 | 1.25 |
| 3 | 1.015 | 1.0 | Gd | 12.0 | 1.0 | 2.0 | 1.25 |
| 4 | 1.030 | 1.0 | Gd | 12.0 | 1.0 | 2.0 | 1.25 |
| 5 | 1.050 | 1.0 | Gd | 12.0 | 1.0 | 2.0 | 1.25 |
| *6 | 1.060 | 1.0 | Gd | 12.0 | 1.0 | 2.0 | 1.25 |
| *7 | 1.015 | 0.0 | Gd | 9.0 | 1.0 | 2.0 | 1.25 |
| 8 | 1.015 | 0.1 | Gd | 9.0 | 1.0 | 2.0 | 1.25 |
| 9 | 1.015 | 0.5 | Gd | 9.0 | 1.0 | 2.0 | 1.25 |
| 10 | 1.015 | 2.0 | Gd | 9.0 | 1.0 | 2.0 | 1.25 |
| 11 | 1.015 | 5.0 | Gd | 9.0 | 1.0 | 2.0 | 1.25 |
| *12 | 1.015 | 6.0 | Gd | 9.0 | 1.0 | 2.0 | 1.25 |
| *13 | 1.015 | 1.0 | Gd | 8.0 | 1.0 | 2.0 | 1.25 |

-continued

| | | | | | | | |
|---|---|---|---|---|---|---|---|
| 14 | 1.015 | 1.0 | Gd | 9.0 | 1.0 | 2.0 | 1.25 |
| 15 | 1.015 | 1.0 | Gd | 15.0 | 1.0 | 2.0 | 1.25 |
| 16 | 1.015 | 1.0 | Gd | 18.0 | 1.0 | 2.0 | 1.25 |
| 17 | 1.015 | 1.0 | Gd | 20.0 | 1.0 | 2.0 | 1.25 |
| *18 | 1.015 | 1.0 | Gd | 21.0 | 1.0 | 2.0 | 1.25 |
| *19 | 1.015 | 1.0 | Gd | 9.0 | 0.0 | 2.0 | 1.25 |
| *20 | 1.015 | 1.0 | Gd | 9.0 | 0.2 | 2.0 | 1.25 |
| 21 | 1.015 | 1.0 | Gd | 9.0 | 0.5 | 2.0 | 1.25 |
| 22 | 1.015 | 1.0 | Gd | 9.0 | 2.0 | 2.0 | 1.25 |
| 23 | 1.015 | 1.0 | Gd | 9.0 | 3.5 | 2.0 | 1.25 |
| *24 | 1.015 | 1.0 | Gd | 9.0 | 4.0 | 2.0 | 1.25 |
| *25 | 1.015 | 1.0 | Gd | 9.0 | 1.0 | 0.0 | 1.25 |
| 26 | 1.015 | 1.0 | Gd | 9.0 | 1.0 | 1.0 | 1.25 |
| 27 | 1.015 | 1.0 | Gd | 12.0 | 1.0 | 3.0 | 1.25 |
| 28 | 1.015 | 1.0 | Gd | 20.0 | 1.0 | 4.0 | 1.25 |
| *29 | 1.015 | 1.0 | Gd | 20.0 | 1.0 | 5.0 | 1.25 |
| *30 | 1.015 | 1.0 | Gd | 12.0 | 1.0 | 2.0 | 0.60 |
| 31 | 1.015 | 1.0 | Gd | 12.0 | 1.0 | 2.0 | 0.80 |
| 32 | 1.015 | 1.0 | Gd | 12.0 | 1.0 | 2.0 | 1.50 |
| 33 | 1.015 | 1.0 | Gd | 12.0 | 1.0 | 2.0 | 3.00 |
| 34 | 1.015 | 1.0 | Gd | 12.0 | 1.0 | 2.0 | 5.00 |
| *35 | 1.015 | 1.0 | Gd | 12.0 | 1.0 | 2.0 | 6.00 |
| 36 | 1.015 | 1.0 | Y | 12.0 | 1.0 | 2.0 | 1.25 |
| 37 | 1.015 | 1.0 | La | 12.0 | 1.0 | 2.0 | 1.25 |
| 38 | 1.015 | 1.0 | Ce | 12.0 | 1.0 | 2.0 | 1.25 |
| 39 | 1.015 | 1.0 | Pr | 12.0 | 1.0 | 2.0 | 1.25 |
| 40 | 1.015 | 1.0 | Nd | 12.0 | 1.0 | 2.0 | 1.25 |
| 41 | 1.015 | 1.0 | Sm | 12.0 | 1.0 | 2.0 | 1.25 |
| 42 | 1.015 | 1.0 | Eu | 12.0 | 1.0 | 2.0 | 1.25 |
| 43 | 1.015 | 1.0 | Tb | 12.0 | 1.0 | 2.0 | 1.25 |
| 44 | 1.015 | 1.0 | Dy | 12.0 | 1.0 | 2.0 | 1.25 |
| 45 | 1.015 | 1.0 | Ho | 12.0 | 1.0 | 2.0 | 1.25 |
| 46 | 1.015 | 1.0 | Er | 12.0 | 1.0 | 2.0 | 1.25 |
| 47 | 1.015 | 1.0 | Tm | 12.0 | 1.0 | 2.0 | 1.25 |
| 48 | 1.015 | 1.0 | Yb | 12.0 | 1.0 | 2.0 | 1.25 |
| 49 | 1.015 | 1.0 | Lu | 12.0 | 1.0 | 2.0 | 1.25 |

[Table 2]
$100.0 Ba_m TiO_a + xCuO + aRO_n + bMnO + cMgO + fSiO_2$

| Sample No. | Firing temperature [° C.] | εr [-] | tan δ [%] | ρ [Ωm] | MTTF [hour] | 300 kHz |
|---|---|---|---|---|---|---|
| *1 | 1200 | 680 | 0.3 | $9.5 \times 10^{10}$ | 90 | 1.8 |
| 2 | 1200 | 670 | 0.3 | $2.5 \times 10^{11}$ | 120 | 0.8 |
| 3 | 1200 | 650 | 0.2 | $7.3 \times 10^{11}$ | 140 | 0.6 |
| 4 | 1250 | 630 | 0.2 | $3.4 \times 10^{11}$ | 120 | 0.6 |
| 5 | 1275 | 620 | 0.4 | $6.2 \times 10^{11}$ | 115 | 0.7 |
| *6 | 1300 | 600 | 0.6 | $5.4 \times 10^{11}$ | 90 | 1.8 |
| *7 | 1225 | 670 | 0.3 | $7.2 \times 10^{11}$ | 90 | 0.6 |
| 8 | 1225 | 660 | 0.2 | $8.1 \times 10^{11}$ | 110 | 0.6 |
| 9 | 1225 | 650 | 0.2 | $8.3 \times 10^{11}$ | 120 | 0.7 |
| 10 | 1225 | 650 | 0.3 | $7.5 \times 10^{11}$ | 160 | 0.7 |
| 11 | 1175 | 630 | 0.3 | $2.5 \times 10^{11}$ | 140 | 0.7 |
| *12 | 1175 | 630 | 0.4 | $8.3 \times 10^{10}$ | 110 | 1.2 |
| *13 | 1175 | 900 | 0.3 | $8.0 \times 10^{11}$ | 90 | 0.7 |
| 14 | 1200 | 830 | 0.2 | $7.8 \times 10^{11}$ | 110 | 0.7 |
| 15 | 1250 | 550 | 0.2 | $5.2 \times 10^{11}$ | 160 | 0.5 |
| 16 | 1275 | 450 | 0.1 | $4.6 \times 10^{11}$ | 200 | 0.4 |
| 17 | 1300 | 340 | 0.1 | $6.5 \times 10^{11}$ | 220 | 0.3 |
| *18 | 1300 | 280 | 0.1 | $4.1 \times 10^{11}$ | 230 | 0.3 |
| *19 | 1250 | — | — | $6.5 \times 10^{7}$ | — | — |
| *20 | 1250 | 670 | 0.6 | $8.5 \times 10^{10}$ | 85 | 1.5 |
| 21 | 1225 | 650 | 0.4 | $8.2 \times 10^{11}$ | 135 | 0.7 |
| 22 | 1200 | 650 | 0.2 | $2.0 \times 10^{12}$ | 160 | 0.6 |
| 23 | 1200 | 630 | 0.2 | $3.3 \times 10^{11}$ | 180 | 0.6 |
| *24 | 1200 | 600 | 0.4 | $9.0 \times 10^{10}$ | 190 | 0.9 |
| *25 | 1200 | 760 | 0.3 | $8.3 \times 10^{11}$ | 80 | 0.8 |
| 26 | 1200 | 800 | 0.2 | $8.5 \times 10^{11}$ | 105 | 0.7 |
| 27 | 1200 | 650 | 0.3 | $7.5 \times 10^{11}$ | 140 | 0.6 |
| 28 | 1300 | 320 | 0.1 | $8.4 \times 10^{11}$ | 240 | 0.3 |
| *29 | 1300 | 280 | 0.1 | $7.4 \times 10^{11}$ | 250 | 0.2 |
| *30 | Insufficient sintering | | | | | |
| 31 | 1250 | 600 | 0.4 | $2.3 \times 10^{12}$ | 135 | 0.8 |
| 32 | 1175 | 650 | 0.3 | $1.8 \times 10^{12}$ | 140 | 0.6 |
| 33 | 1150 | 620 | 0.2 | $8.5 \times 10^{11}$ | 120 | 0.5 |
| 34 | 1100 | 600 | 0.1 | $6.5 \times 10^{11}$ | 110 | 0.4 |
| *35 | 1100 | 590 | 0.1 | $7.2 \times 10^{11}$ | 90 | 0.3 |
| 36 | 1225 | 630 | 0.3 | $3.5 \times 10^{11}$ | 135 | 0.6 |
| 37 | 1175 | 610 | 0.1 | $4.2 \times 10^{11}$ | 135 | 0.4 |
| 38 | 1175 | 620 | 0.1 | $5.3 \times 10^{11}$ | 140 | 0.4 |
| 39 | 1175 | 620 | 0.2 | $4.8 \times 10^{11}$ | 140 | 0.4 |
| 40 | 1175 | 620 | 0.2 | $6.3 \times 10^{11}$ | 150 | 0.4 |
| 41 | 1200 | 630 | 0.2 | $5.7 \times 10^{11}$ | 140 | 0.5 |
| 42 | 1200 | 640 | 0.2 | $5.8 \times 10^{11}$ | 140 | 0.5 |
| 43 | 1200 | 640 | 0.2 | $6.4 \times 10^{11}$ | 150 | 0.5 |
| 44 | 1225 | 660 | 0.2 | $7.2 \times 10^{11}$ | 150 | 0.5 |
| 45 | 1225 | 650 | 0.2 | $9.5 \times 10^{11}$ | 140 | 0.5 |
| 46 | 1225 | 640 | 0.3 | $6.5 \times 10^{11}$ | 140 | 0.6 |
| 47 | 1225 | 640 | 0.3 | $7.2 \times 10^{11}$ | 140 | 0.6 |
| 48 | 1250 | 630 | 0.3 | $5.5 \times 10^{11}$ | 135 | 0.6 |
| 49 | 1250 | 630 | 0.3 | $4.8 \times 10^{11}$ | 135 | 0.7 |

From the results shown in Table 2, among Samples 1 to 6 for investigating the influence of the ratio m of Ba to Ti (Ba/Ti), it was found that each of Samples 2 to 5, which were within the range of the present invention ($0.990 \leq m \leq 1.050$), had high reliability even when operated with high-voltage direct current or high-frequency/high-voltage alternating current from the resulting properties described as follows: a dielectric constant ($\epsilon$) of 300 or more was ensured; the dielectric loss (tan δ) was 0.5% or less at 1 kHz and 50 Vrms/mm; the resistivity ($\rho$) was $10^{11}$ Ωm or more; the mean time to failure (MTTF) was as long as 100 hours in the high-temperature load reliability test (175° C., DC field strength: 40 kV/mm), which exhibited high reliability; and the dielectric loss (tan δ) was 0.8% or less in the application of high-frequency alternating current (300 kHz, 1.77 kVrms/mm), which exhibited low heat generation. In contrast, among Samples 1 and 6 that were outside the range of the present invention, it was found that Sample 1 having a ratio m of less than 0.990 had the following properties: the resistivity ($\rho$) was $9.5 \times 10^{10}$ Ωm, which was lower than $10^{11}$ Ωm; the mean time to failure (MTTF) was 90 hours, which was shorter than 100 hours; and the dielectric loss (tan δ) was as large as 1.8% at 300 kHz, which exhibited tendency to generate heat. Furthermore, it was found that Sample 6 having a ratio m of more than 1.050 had the following properties: the mean time to failure (MTTF) was 90 hours, which was shorter than 100 hours; and the dielectric loss (tan δ) was as large as 1.8% at 300 kHz, which exhibited the tendency to generate heat.

From the results shown in Table 2, among Samples 7 to 12 for investigating the influence of the CuO content x, it was found that Samples 8 to 11, which were within the range of the present invention ($0.1 \leq x \leq 5.0$), satisfied the characteristic evaluation. In contrast, in Samples 7 and 12 that were outside the range of the present invention, it was found that Sample 7 having an x of less than 0.1 and not containing CuO had a mean time to failure (MTTF) of 90 hours, which was shorter than 100 hours. Furthermore, it was found that Sample 12 having an x of more than 5.0 had a resistivity ($\rho$) of $8.3 \times 10^{10}$ Ωm, which was lower than $10^{11}$ Ωm; and the dielectric loss (tan δ) was as large as 1.2% at 300 kHz.

From the results shown in Table 2, among Samples 13 to 18 for investigating the influence of the $RO_n$ content a, it was found that Samples 14 to 17, which were within the range of the present invention ($9.0 \leq a \leq 20.0$), satisfied the characteristic evaluation. In contrast, in Samples 13 and 18, it was found that Sample 13 having a content a of less than 9.0 had a mean time to failure (MTTF) of 90 hours, which was shorter than 100 hours. Furthermore, it was found that Sample 18 having a content a of more than 20.0 had a dielectric constant ($\epsilon$) of 280, which was lower than 300.

From the results shown in Table 2, among Samples 19 to 24 for investigate the influence of the MnO content b, it was found that Samples 21 to 23, which were within the range of the present invention (0.5≦b≦3.5), satisfied the characteristic evaluation. In contrast, among Samples 19, 20, and 24, which were outside the range of the present invention, it was found that Sample 19 not containing MnO was not measured other than the resistivity (ρ). It was found that Sample 20 having a content b of less than 0.5, had a resistivity (ρ) of $8.5 \times 10^{10}$ Ωm, which was lower than $10^{11}$ Ωm; and had a mean time to failure (MTTF) of 85 hours, which was shorter than 100 hours. Furthermore, it was found that Sample 24 having a content b of more than 3.5 had a resistivity (ρ) of $9.0 \times 10^{10}$ Ωm, which was lower than $10^{11}$ Ωm.

From the results shown in Table 2, among Samples 25 to 29 for investigate the influence of the MgO content c, it was found that Samples 26 to 28, which were within the range of the present invention (0<c≦4.0), satisfied the characteristic evaluation. In contrast, in Samples 25 and 29, which were outside the range of the present invention, it was found that Sample 25 not containing Mgo had a mean time to failure (MTTF) of 80 hours, which was shorter than 100 hours. Furthermore, it was found that Sample 29 having a content c of more than 4.0 had a dielectric constant (ε) of 280, which was lower than 300.

From the results shown in Table 2, among Samples 30 to 35 for investigate the influence of the amount f of the sintering additive ($SiO_2$) added, it was found that Samples 30 to 34, which were within the range of the present invention (0.8<f≦5.0), satisfied the characteristic evaluation. In contrast, in Samples 30 and 35, which were outside the range of the present invention, it was found that Sample 30 having an amount added of less than 0.8 parts by weight was not sintered. Furthermore, it was found that Sample 35 having an amount added of more than 5.0 had a mean time to failure (MTTF) of 90 hours, which was shorter than 100 hours.

From the results shown in Table 2, among Samples 36 to 49 for investigate the influence of the type of $RO_n$, i.e., the type of oxide of the rare-earth element, it was found that all Samples satisfied the characteristic evaluation as long as the $RO_n$ content a was within the range of the present invention (9.0≦a≦20.0).

EXAMPLE 2

In this example, as shown in Table 3, NiO or ZnO as MO was added to the main component of Sample 17 obtained in EXAMPLE 1. The content d of each of NiO and ZnO was changed from the preferred range of the present invention (0<c+d≦4.0, and d>0) to the outside of the range of the present invention. Dielectric ceramic compositions, Samples 50 to 55, were prepared by the same procedure as that in EXAMPLE 1. Then, multilayer ceramic capacitors using these Samples were produced as in EXAMPLE 1. The electrical properties of the multilayer ceramic capacitors were measured as in EXAMPLE 1. Table 4 shows the results. In Tables 3 and 4, the sample numbers with asterisks indicate that the samples were outside the range of the present invention.

[Table 3]
$100.0Ba_mTiO_s + xCuO + aRO_n + bMnO + cMgO + dMO + fSiO_2$

| Sample No. | m | x | R | a | b | c | M | d | c+d | f |
|---|---|---|---|---|---|---|---|---|---|---|
| 17 | 1.015 | 1.0 | Gd | 20.0 | 1.0 | 2.0 | — | 0.0 | 2.0 | 1.25 |
| 50 | 1.015 | 1.0 | Gd | 20.0 | 1.0 | 2.0 | Ni | 1.0 | 3.0 | 1.25 |

-continued

| | | | | | | | | | | |
|---|---|---|---|---|---|---|---|---|---|---|
| 51 | 1.015 | 1.0 | Gd | 20.0 | 1.0 | 2.0 | Ni | 2.0 | 4.0 | 1.25 |
| *52 | 1.015 | 1.0 | Gd | 20.0 | 1.0 | 2.0 | Ni | 3.0 | 5.0 | 1.25 |
| 53 | 1.015 | 1.0 | Gd | 20.0 | 1.0 | 2.0 | Zn | 1.0 | 3.0 | 1.25 |
| 54 | 1.015 | 1.0 | Gd | 20.0 | 1.0 | 2.0 | Zn | 2.0 | 4.0 | 1.25 |
| *55 | 1.015 | 1.0 | Gd | 20.0 | 1.0 | 2.0 | Zn | 3.0 | 5.0 | 1.25 |

[Table 4]
$100.0Ba_mTiO_3 + xCuO + aRO_n + bMnO + cMgO + dMO + fSiO_2$

| Sample No. | Firing temperature [°C.] | εr [−] | tan [%] | ρ [Ωm] | MTTF [hour] | 300 kHz |
|---|---|---|---|---|---|---|
| 17 | 1300 | 340 | 0.1 | $6.5 \times 10^{11}$ | 220 | 0.3 |
| 50 | 1300 | 340 | 0.1 | $7.5 \times 10^{11}$ | 230 | 0.3 |
| 51 | 1300 | 320 | 0.1 | $8.0 \times 10^{11}$ | 230 | 0.3 |
| *52 | 1300 | 280 | 0.1 | $7.3 \times 10^{11}$ | 240 | 0.2 |
| 53 | 1300 | 340 | 0.1 | $7.4 \times 10^{11}$ | 230 | 0.3 |
| 54 | 1300 | 320 | 0.1 | $7.9 \times 10^{11}$ | 240 | 0.3 |
| *55 | 1300 | 280 | 0.1 | $7.0 \times 10^{11}$ | 240 | 0.2 |

From the results shown in Table 4, it was found that Samples 50 and 51, in which NiO was incorporated in each main component within the preferred range of the present invention (0<c+d≦4.0, and d>0), had higher resistivity (ρ) and a prolonged mean time to failure (MTTF) compared with those of Sample 17 not containing NiO, which exhibited further improved reliability. It was found that Sample 52 having a NiO content exceeding the preferred range of the present invention had a slightly lower dielectric constant (ε) than that of Sample 17 not containing NiO. However, it was found that Sample 52 had improved resistivity (ρ) and a prolonged mean time to failure (MTTF) compared with Sample 17. With respect to Samples 53 to 55 in which ZnO in place of NiO was incorporated as MO, it was confirmed that there was a tendency similar to the case where NiO was incorporated.

EXAMPLE 3

In this example, as shown in Table 5, $Ba(Zr,Hf)O_3$ was incorporated as $X(Zr,Hf)O_3$ in the main component of Sample 17 obtained in EXAMPLE 1. The content e thereof was changed from the preferred range of the present invention (0 mol<e≦15 mol with respect to 100 mol of $Ba_mTiO_3$) to the outside of the range of the present invention. Dielectric ceramic compositions, Samples 56 to 60, were prepared by the same procedure as that in EXAMPLE 1. Then, multilayer ceramic capacitors using these Samples were produced as in EXAMPLE 1. The electrical properties of the multilayer ceramic capacitors were measured as in EXAMPLE 1. Table 6 shows the results. In Tables 5 and 6, the sample numbers with asterisks indicate that the samples were outside the range of the present invention.

Furthermore, as shown in Table 5, $Sr(Zr,Hf)O_3$ was incorporated as $X(Zr,Hf)O_3$ in the main component of Sample 50 obtained in EXAMPLE 2. The content thereof was changed from the preferred range of the present invention (0<e≦15) to the outside of the range of the present invention. As a result, dielectric ceramic compositions, Samples 61 to 62, were prepared. The electrical properties of these Samples were measured. Table 6 shows the results compared with Sample 50. Furthermore, as shown in Table 5, $Ca(Zr,Hf)O_3$ was incorporated as $X(Zr,Hf)O_3$ in the main component of Sample 53 obtained in EXAMPLE 2. The content thereof was changed from the preferred range of the present invention (0<e≦15) to the outside of the range of the present invention. As a result, dielectric ceramic compositions, Samples 63 to 64, were prepared. The electrical properties of these Samples were measured. Table 6 shows the results compared with Sample 53.

[Table 5]
100.0Ba$_m$TiO$_a$ + xCuO + aRO$_n$ + bMnO + cMgO + dMO + eX(Zr, Hf)O$_3$ + fSiO$_2$

| Sample No. | m | x | R | a | b | c | M | d | c + d | X | e | f |
|---|---|---|---|---|---|---|---|---|---|---|---|---|
| 17 | 1.015 | 1.0 | Gd | 20.0 | 1.0 | 2.0 | — | 0.0 | 2.0 | Ba | 0.0 | 1.25 |
| 56 | 1.015 | 1.0 | Gd | 20.0 | 1.0 | 2.0 | — | 0.0 | 2.0 | Ba | 6.0 | 1.25 |
| 57 | 1.015 | 1.0 | Gd | 20.0 | 1.0 | 2.0 | — | 0.0 | 2.0 | Ba | 9.0 | 1.25 |
| 58 | 1.015 | 1.0 | Gd | 20.0 | 1.0 | 2.0 | — | 0.0 | 2.0 | Ba | 12.0 | 1.25 |
| 59 | 1.015 | 1.0 | Gd | 20.0 | 1.0 | 2.0 | — | 0.0 | 2.0 | Ba | 15.0 | 1.25 |
| *60 | 1.015 | 1.0 | Gd | 20.0 | 1.0 | 2.0 | — | 0.0 | 2.0 | Ba | 18.0 | 1.25 |
| 50 | 1.015 | 1.0 | Gd | 20.0 | 1.0 | 2.0 | Ni | 1.0 | 3.0 | Sr | 0.0 | 1.25 |
| 61 | 1.015 | 1.0 | Gd | 20.0 | 1.0 | 1.0 | Ni | 1.0 | 2.0 | Sr | 12.0 | 1.25 |
| *62 | 1.015 | 1.0 | Gd | 20.0 | 1.0 | 1.0 | Ni | 1.0 | 2.0 | Sr | 18.0 | 1.25 |
| 53 | 1.015 | 1.0 | Gd | 20.0 | 1.0 | 2.0 | Zn | 1.0 | 3.0 | Ca | 0.0 | 1.25 |
| 63 | 1.015 | 1.0 | Gd | 20.0 | 1.0 | 1.0 | Zn | 1.0 | 2.0 | Ca | 12.0 | 1.25 |
| *64 | 1.015 | 1.0 | Gd | 20.0 | 1.0 | 1.0 | Zn | 1.0 | 2.0 | Ca | 18.0 | 1.25 |

[Table 6]
100.0BamTiO$_3$ + xCuO + aRO$_n$ + bMnO + cMgO + dMO + eX(Zr, Hf)O$_3$ + fSiO$_2$

| Sample No. | Firing temperature [° C.] | εr [−] | tan δ [%] | ρ [Ωm] | MTTF [hour] | 300 kHz |
|---|---|---|---|---|---|---|
| 17 | 1300 | 340 | 0.1 | 6.5 × 10$^{11}$ | 220 | 0.3 |
| 56 | 1300 | 360 | 0.2 | 6.5 × 10$^{11}$ | 230 | 0.3 |
| 57 | 1300 | 350 | 0.2 | 7.0 × 10$^{11}$ | 240 | 0.3 |
| 58 | 1300 | 330 | 0.1 | 7.5 × 10$^{11}$ | 245 | 0.2 |
| 59 | 1300 | 310 | 0.1 | 7.8 × 10$^{11}$ | 250 | 0.2 |
| *60 | 1325 | 290 | 0.1 | 8.2 × 10$^{11}$ | 260 | 0.2 |
| 50 | 1300 | 340 | 0.1 | 7.5 × 10$^{11}$ | 230 | 0.3 |
| 61 | 1200 | 320 | 0.1 | 7.5 × 10$^{11}$ | 240 | 0.3 |
| *62 | 1200 | 280 | 0.1 | 8.4 × 10$^{11}$ | 250 | 0.2 |
| 53 | 1300 | 340 | 0.1 | 7.4 × 10$^{11}$ | 230 | 0.3 |
| 63 | 1200 | 330 | 0.1 | 7.8 × 10$^{11}$ | 240 | 0.3 |
| *64 | 1200 | 290 | 0.1 | 8.0 × 10$^{11}$ | 250 | 0.2 |

From the results shown in Table 6, it was found that Samples 56 to 59, in which Ba(Zr,Hf)O$_3$ was incorporated in each main component within the preferred range of the present invention (0<e≦15) without MO, had a prolonged mean time to failure (MTTF) compared with that of Sample 17 not containing Ba(Zr,Hf)O$_3$, which exhibited more improved reliability. It was found that Sample 60 having a Ba(Zr,Hf)O$_3$ content exceeding the preferred range of the present invention had a slightly lower dielectric constant (ε) than that of Sample 17 not containing Ba(Zr,Hf)O$_3$. However, it was found that Sample 60 had a prolonged mean time to failure (MTTF) compared with that of Sample 17, which exhibited more improved reliability.

From the results shown in Table 6, it was found that Sample 61, in which Sr(Zr,Hf)O$_3$ was incorporated in Sample 50 obtained in EXAMPLE 2 within the preferred range of the present invention, had a further prolonged mean time to failure (MTTF). It was found that Sample 62 having a Sr(Zr,Hf)O$_3$ content exceeding the preferred range of the present invention had a lower dielectric constant (ε) than that of Sample 50 obtained in EXAMPLE 2. However, it was found that Sample 62 had a prolonged mean time to failure (MTTF) compared with that of Sample 50, which exhibited further improved reliability. With respect to Samples 63 and 64 in which Sr(Zr,Hf)O$_3$ was incorporated to Sample 53 obtained in EXAMPLE 2, it was confirmed that there was a tendency similar to Samples 61 and 62.

The present invention is not limited to the examples. The present invention may include any of dielectric ceramic compositions and multilayer ceramic capacitors as long as requirements of the present invention are satisfied.

The present invention can be suitably used for a multilayer ceramic capacitor operated with high-voltage direct current or high-frequency/high-voltage alternating current.

The invention claimed is:

1. A dielectric ceramic composition comprising:
   a main component expressed as 100Ba$_m$TiO$_3$+xCuO+aRO$_n$+bMnO+cMgO; and
   a sintering additive, the dielectric ceramic composition containing 0.8 to 5.0 parts by weight of the sintering additive with respect to 100 parts by weight of the main component,
   wherein coefficients 100, x, a, b, and c represent molar ratios; m represents the ratio of Ba to Ti; R represents at least one metal element selected from the group consisting of Y, La, Ce, Pr, Nd, Sm, Eu, Gd, Tb, Dy, Ho, Er, Tm, Yb, and Lu; and n represents a positive number, and
   wherein m, x, a, b, and c meet the following relationships:

$0.990 \leq m \leq 1.050$;

$0.1 \leq x \leq 5.0$;

$9.0 \leq a \leq 20.0$;

$0.5 \leq b \leq 3.5$; and $0 \leq c \leq 4.0$.

2. The dielectric ceramic composition according to claim 1, further comprising MO as an additive, wherein M represents at least one metal element selected from Ni and Zn, the main component being expressed as $100Ba_mTiO_3+xCuO+aRO_n+bMnO+cMgO+dMO$, wherein c and d meet the following relationships:

$$0<c+d\leq4.0; \text{ and}$$

$$d>0.$$

3. The dielectric ceramic composition according to claim 2, further comprising $X(Zr,Hf)O_3$ as a second additive in the main component, wherein X represents at least one metal element selected from Ba, Sr, and Ca, and wherein the content of the second additive is more than 0 mol and 15 mol or less with respect to 100 mol of $Ba_mTiO_3$.

4. The dielectric ceramic composition according to claim 1, further comprising $X(Zr,Hf)O_3$ as an additive in the main component, wherein X represents at least one metal element selected from Ba, Sr, and Ca, and wherein the content of the additive is more than 0 mol and 15 mol or less with respect to 100 mol of $Ba_mTiO_3$.

5. The dielectric ceramic composition according to claim 1, wherein the sintering additive is $SiO_2$.

6. A multilayer ceramic capacitor comprising:
a plurality of dielectric ceramic layers;
internal electrodes, each internal electrode disposed between respective dielectric ceramic layers; and
external electrodes electrically connected to the internal electrodes,
wherein the dielectric ceramic layers are each composed of a dielectric ceramic composition comprising:
a main component expressed as $100Ba_mTiO_3+xCuO+aRO_n+bMnO+cMgO$; and
a sintering additive, the dielectric ceramic composition containing 0.8 to 5.0 parts by weight of the sintering additive with respect to 100 parts by weight of the main component,
wherein coefficients 100, x, a, b, and c represent molar ratios; m represents the ratio of Ba to Ti; R represents at least one metal element selected from the group consisting of Y, La, Ce, Pr, Nd, Sm, Eu, Gd, Tb, Dy, Ho, Er, Tm, Yb, and Lu; and n represents a positive number, and
wherein m, x, a, b, and c meet the following relationships:

$$0.990\leq m\leq1.050;$$

$$0.1\leq x\leq5.0;$$

$$9.0\leq a\leq20.0;$$

$$0.5\leq b\leq3.5; \text{ and}$$

$$0\leq c\leq4.0.$$

7. The multilayer ceramic capacitor according to claim 6, wherein the internal electrodes are each composed of a conductive material containing Ni, a Ni alloy, Cu, or a Cu alloy.

8. The multilayer ceramic capacitor according to claim 7, further comprising MO as an additive, wherein M represents at least one metal element selected from Ni and Zn, the main component being expressed as $100Ba_mTiO_3+xCuO+aRO_n+bMnO+cMgO+dMO$, wherein c and d meet the following relationships:

$$0<c+d\leq4.0; \text{ and}$$

$$d>0.$$

9. The multilayer ceramic capacitor according to claim 8, further comprising $X(Zr,Hf)O_3$ as a second additive in the main component, wherein X represents at least one metal element selected from Ba, Sr, and Ca, and wherein the content of the second additive is more than 0 mol and 15 mol or less with respect to 100 mol of $Ba_mTiO_3$.

10. The multilayer ceramic capacitor according to claim 6, further comprising MO as an additive, wherein M represents at least one metal element selected from Ni and Zn, the main component being expressed as $100Ba_mTiO_3+xCuO+aRO_n+bMnO+cMgO+dMO$, wherein c and d meet the following relationships:

$$0<c+d\leq4.0; \text{ and}$$

$$d>0.$$

11. The multilayer ceramic capacitor according to claim 10, further comprising $X(Zr,Hf)O_3$ as a second additive in the main component, wherein X represents at least one metal element selected from Ba, Sr, and Ca, and wherein the content of the second additive is more than 0 mol and 15 mol or less with respect to 100 mol of $Ba_mTiO_3$.

12. The multilayer ceramic capacitor according to claim 6, further comprising $X(Zr,Hf)O_3$ as an additive in the main component, wherein X represents at least one metal element selected from Ba, Sr, and Ca, and wherein the content of the additive is more than 0 mol and 15 mol or less with respect to 100 mol of $Ba_mTiO_3$.

13. The multilayer ceramic capacitor according to claim 6, wherein the sintering additive is $SiO_2$.

* * * * *